United States Patent

Guerinault et al.

Patent Number: 5,086,969
Date of Patent: Feb. 11, 1992

[54] METHOD OF BONDING A METAL CONNECTION TO AN ELECTRODE HAVING A FOAM TYPE SUBSTRATE FOR AN ELECTROCHEMICAL CELL, AND AN ELECTRODE OBTAINED BY THE METHOD

[75] Inventors: Jean-Marc Guerinault, Leognan; Joël Brunarie, Bordeaux, both of France

[73] Assignee: SAFT, Romainville, France

[21] Appl. No.: 638,864

[22] Filed: Dec. 18, 1990

[30] Foreign Application Priority Data

Dec. 13, 1990 [FR] France .................. 90 15607

[51] Int. Cl.⁵ .............................. B23K 31/02
[52] U.S. Cl. ......................... 228/189; 228/120; 429/211; 29/730
[58] Field of Search ............. 228/189, 120; 429/211, 429/182, 183; 29/623.1, 730

[56] References Cited

U.S. PATENT DOCUMENTS

| | | | |
|---|---|---|---|
| 3,899,356 | 8/1975 | Groult et al. | 29/623.1 |
| 4,100,674 | 7/1978 | Tiegel | 29/623.1 |
| 4,119,771 | 10/1978 | Saridakis | 429/211 |
| 4,363,857 | 12/1982 | Mix | 29/623.1 |
| 4,690,748 | 9/1987 | Beaver et al. | 429/211 |
| 4,760,001 | 7/1988 | Nam et al. | 429/211 |

Primary Examiner—Richard K. Seidel
Assistant Examiner—Chuck Y. Mah
Attorney, Agent, or Firm—Sughrue, Mion, Zinn, Macpeak & Seas

[57] ABSTRACT

A method of bonding a metal connection onto an electrode for an electrochemical cell including a foam type substrate (2), which substrate has been filled with active material and then compressed, the method being characterized by the facts that: at least one perforation (3, 4) is formed through said electrode; a metal tongue (5) is compressed against said perforation and the surrounding zone, which tongue penetrates superficially into a first face of the electrode; and said connection (11) is welded onto said metal tongue (5) through said perforation (3, 4).

8 Claims, 3 Drawing Sheets

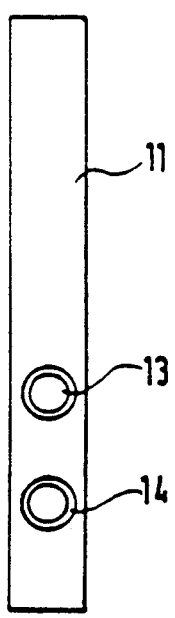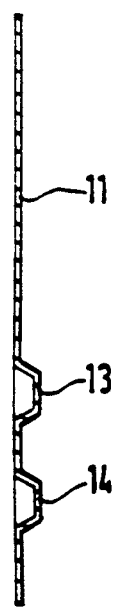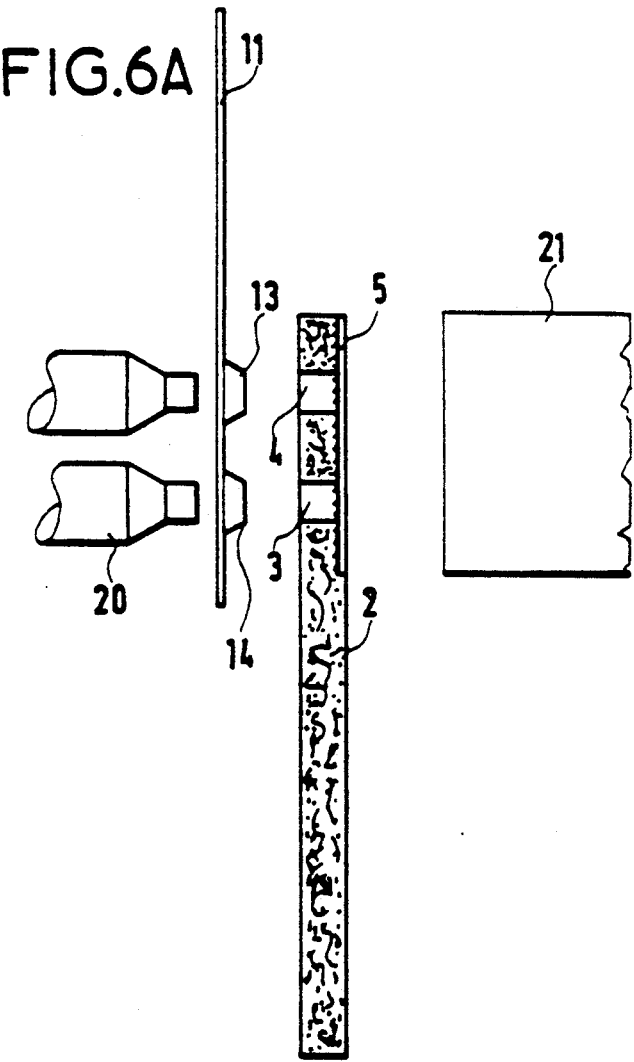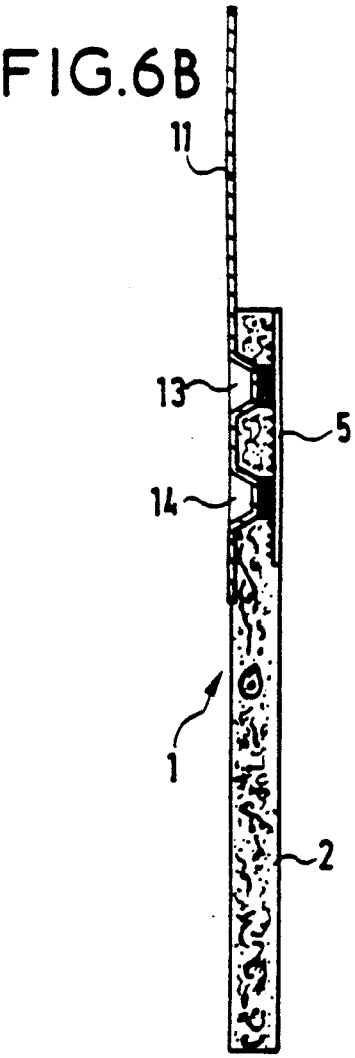

METHOD OF BONDING A METAL CONNECTION TO AN ELECTRODE HAVING A FOAM TYPE SUBSTRATE FOR AN ELECTROCHEMICAL CELL, AND AN ELECTRODE OBTAINED BY THE METHOD

The present invention relates to a method of bonding a metal connection to an electrode having a foam type substrate for an electrochemical cell, and to an electrode obtained by the method. It relates in particular to electrochemical cells having an alkaline electrolyte and in which at least one of the electrodes comprises a porous metal substrate containing active material. Such a porous support has a lattice structure comparable to that of a sponge in which the voids are interconnected in a three-dimensional network: it is referred to by the term "foam". Before being filled with active material, the porosity of the foam is greater than 95%. After being filled, the electrode is compressed to a design thickness, thereby facilitating assembly and ensuring that the cell operates properly.

The cells concerned may have plane electrodes, but it is more common for the electrodes to be spiral-wound.

Connectng such an electrode to one of the terminals of the cell means that a metal part must be connected thereto.

Such a connection presents a problem since it is not possible to weld onto foam containing active material.

If welding is performed before the foam is filled, then preparing the surface for welding constitutes an additional operation and also suffers from the drawback of reducing the active area of the electrode. In addition, such a method suffers from the drawback of the relatively low reliability of welding thin components.

It also appears not to be possible to crimp a foam connection on the foam substrate. However, it is possible to crimp a metal foil connection on such a substrate. Naturally this method suffers from the drawback of causing a thickening to appear on the electrode, of masking a portion of the electrochemically active area thereof, and of stiffening it locally, which is detrimental when winding a spiral.

In absolute terms it would not be impossible to cut up the foam (possibly containing active material) so as to provide a connecting tongue. However such an operation is expensive since it gives rise to a loss of foam and to a loss of active material.

An object of the present invention is to implement a bonding method which is cheaper than prior methods and which enables a connection of satisfactory strength to be obtained.

The present invention provides a method of bonding a metal connection to an electrode for an electrochemical cell, the electrode having a foam type substrate with mass per unit area lying in the range 2 grams per square decimeter ($g/dm^2$) to 8 $g/dm^2$, which substrate has been filled with active material and has then been compressed, the method being characterized by the facts that:

at least one perforation is formed through said electrode;

a metal tongue is compressed against said perforation and the surrounding zone, which tongue penetrates superficially into a first face of the electrode; and said connection is welded to said metal tongue through said perforation in the electrode.

In some cases it may be advantageous to place said connection on said tongue.

Said perforation may have an area in the range 3 $mm^2$ to 15 $mm^2$.

Preferably, said tongue is made of finely perforated nickel or nickel-plated steel foil. It has 200 to 600 holes per $cm^2$ and its perforation depth lies in the range one-half to four times its thickness.

The tongue may also be made of reeled-out foil or of metal foam.

Said connection is advantageously made of nickel or nickel-plated steel and may include at least one boss which is received in said perforation to facilitate welding to said tongue.

It is preferable for the strength of the assembly to provide two perforations through said electrode. In addition, for an electrode which is to be spiral-wound, the connection is better placed on the inner or concave face of the electrode.

The method of the invention and the resulting electrode have the following advantages in particular:

simplicity in the geometrical shape of the tongue and of the connection;

simplicity in implementation;

no preliminary operations for preparing the active portion of the electrode;

reduced mechanical stress on the substrate filled with active material, thereby making it possible to use a support having a lower mass per unit area, e.g. lying in the range 3 $g/dm^2$ to 5 $g/dm^2$; and the connection is of satisfactory strength.

Other characteristics and advantages of the present invention appear from the following description of embodiments given by way of non-limiting illustration. In the accompanying drawings:

FIGS. 5A and 5b are respectively a front view and a section of a connection used in the method of the invention;

FIG. 6A is a highly diagrammatic fragmentary section of an electrode of the invention prior to being bonded with its connection; and FIG. 6B is analogous to FIG. 6A but shows the electrode after its connection has been welded.

EXAMPLE I

Figure 1:
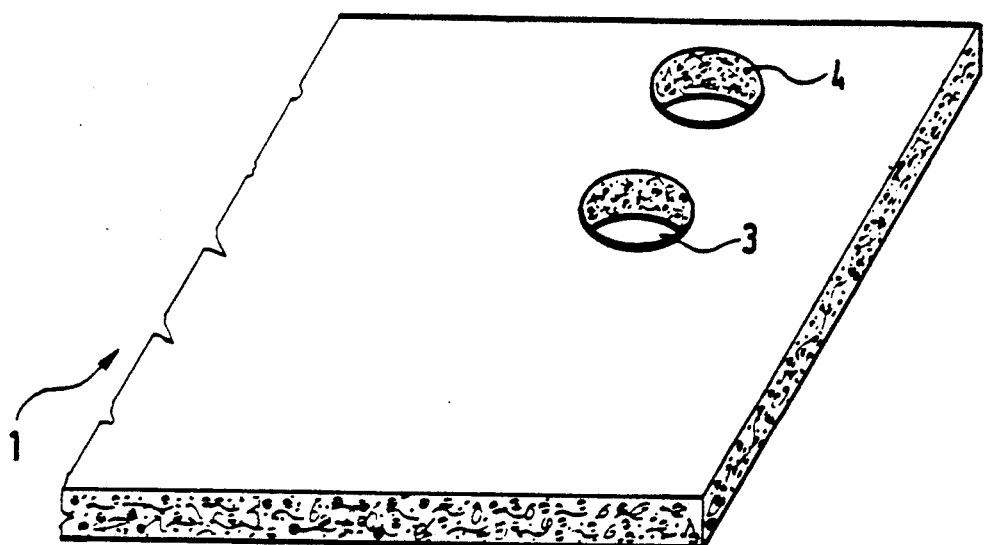
FIG. 1 is a highly diagrammatic view of an electrode substrate of the invention.

FIG. 1 shows an electrode 1 whose substrate 2 is made of nickel foam having a mass per unit area of 6.5 $g/dm^2$ and having the following dimensions: thickness 1.6 mm; length 170 mm; width 30 mm. This substrate is uniformly filled with 17 $g/dm^2$ of active material based on nickel hydroxide.

The support 2 is compressed after being filled so as to obtain a design thickness.

Two perforations or holes 3 and 4 having a diameter of 3 mm are then formed through the substrate 2 in a zone where a connection is to be applied.

Figure 2:
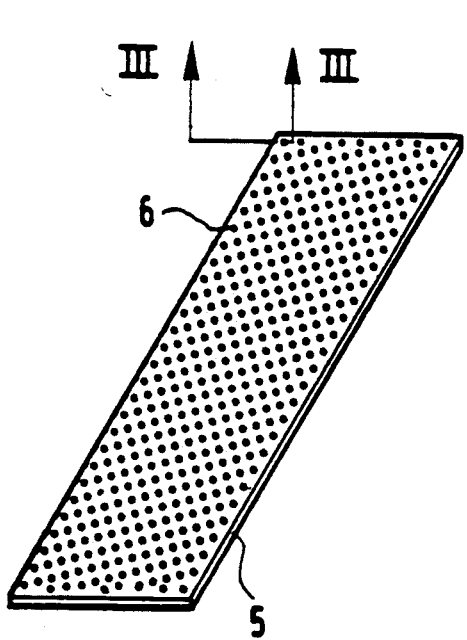
FIG. 2 is a highly diagrammatic view of a tongue used in the method of the invention.
Figure 3:
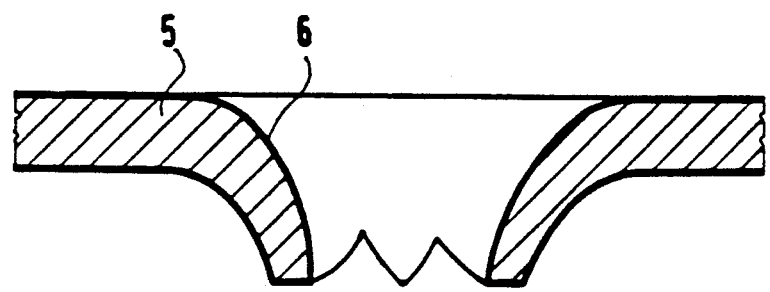
FIG. 3 is a diagrammatic cross-section on line III—III of FIG. 2.

As can be seen in FIG. 2, a tongue 5 is also prepared made of a finely perforated foil of nickel plated steel having a basic thickness e of 0.09 mm. The total thickness hs of the foil and taking account of its holes 6 is 0.3 mm. It has 400 holes per $cm^2$. The length of the tongue 5 is 10 mm and its width is 6 mm.

Figure 4A:
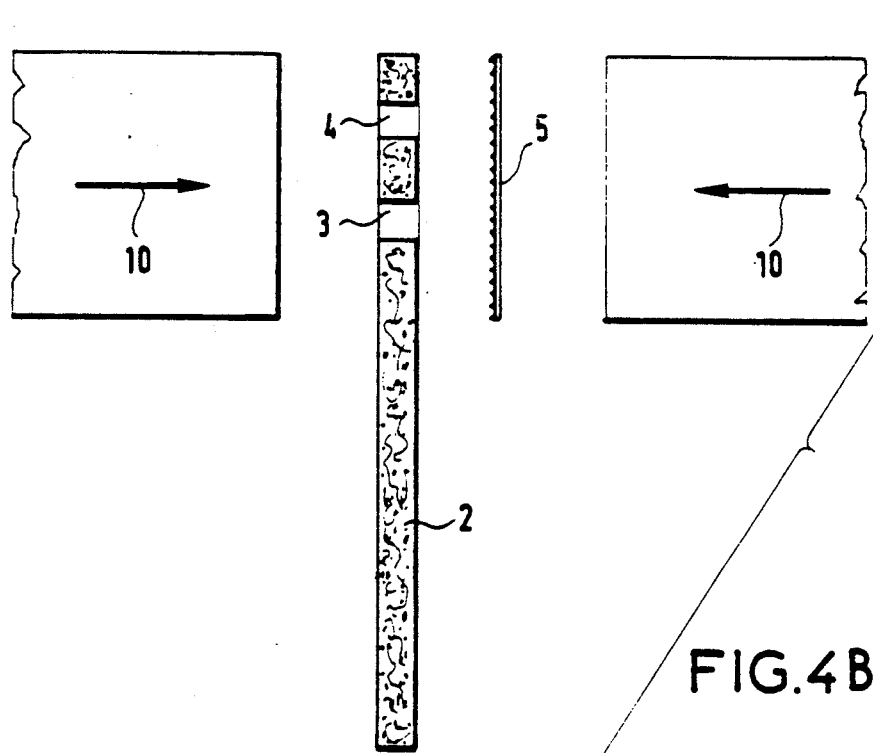
FIGS. 4A and 4B are highly diagrammatic fragmentary section showing the FIG. 2 tongue respectively before and after being compressed into the electrode substrate.
Figure 4B:
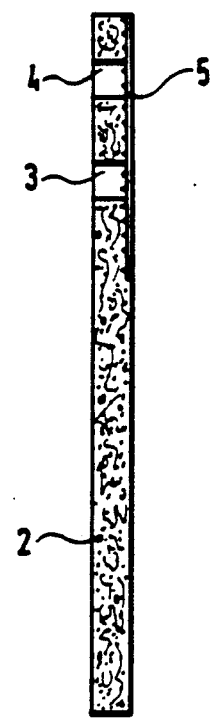

As can be seen in FIGS. 4A and 4B, the substrate 2 and tongue 5 assembly is compressed (arrows 10) between the two plates of a press so as to obtain a thickness of 0.5 mm in the zone under consideration.

As can be seen in FIGS. 5A and 5B, a connection 11 is also prepared made of nickel plated steel having a thickness of 0.2 mm, a length of 24 mm, and a width of 5 mm. It has two bosses 13 and 14 each having a diameter of 2 mm and a height of 0.25 mm.

Thereafter, as can be seen in FIGS. 6A and 6B, the connection 11 is put into place facing the tongue 5 so that the bosses 13 and 14 are centered substantially in the perforations 3 and 4. Resistance welding is then performed using conventional apparatus 20, 21.

FIG. 6B shows the electrode 1 with its connection 11.

EXAMPLE II

A method analogous to that described above is performed having the following modified characteristics.

The substrate 2 is made of 3.5 $g/dm^2$ nickel foam, it is 1.6 mm thick, 130 mm long, and 30 mm wide. It is filled with an active material based on metal alloy hydride.

The substrate 2 is compressed with the tongue 5 so that together they have a thickness of 0.4 mm in the zone for connection.

After its connection 11 has been welded thereto, the resulting electrode may be spiral wound facing a positive electrode based on nickel hydroxide and it may be connected to the housing of a storage cell by conventional resistance welding or merely by contact.

EXAMPLE III

A method is performed analogous to that described in Example I, but this time the tongue is made of 6 $g/dm^2$ nickel foam and it is 1.6 mm thick.

In this case, (and in an embodiment not shown), the connection may be situated on the same face of the electrode as the tongue.

Naturally, the invention is not limited to the embodiments described above. Without going beyond the scope of the invention, any means may be replaced by equivalent means.

We claim:

1. In a bonding method for bonding a metal connection to an electrode for an electrochemical cell, the electrode having a foam type substrate with mass per unit area lying in the range of 2 $g/dm^2$ to 8 $g/dm^2$, said substrate being filled with active material then compressed, the improvement comprising the steps of:
   forming at least one hole through said electrode;
   compressing a metal tongue against said at least one hole and the surrounding zone, and causing said tongue to penetrate superficially into a first face of the electrode; and
   welding said connection to said metal tongue through said at least one hole in the electrode.

2. A bonding method according to claim 1, wherein said tongue is made of finely perforated nickel or nickel-plated steel foil.

3. A bonding method according to claim 2, wherein said foil has 200 to 600 holes per $cm^2$, and its perforation depth lies in the range one-half to four times its thickness.

4. A bonding method according to claim 1, wherein said tongue is reeled out foil.

5. A bonding method according to claim 1, wherein said tongue is made of metal foam.

6. A bonding method according to claim 1, wherein said connection is made of nickel or nickel-plated steel.

7. A bonding method according to claim 1, wherein said connection includes at least one boss which is received in said at least one hole to facilitate welding to said tongue.

8. A bonding method according to claim 1, wherein the area of said at least one hole lies in the range of 3 $mm^2$ and 15 $mm^2$.

* * * * *